United States Patent [19]

Namba et al.

[11] Patent Number: 4,700,510

[45] Date of Patent: Oct. 20, 1987

[54] SPINDLE STOCK UNIT FOR SURFACE GRINDING MACHINE

[75] Inventors: Yoshiharu Namba, 2-9-8, Nishishouji, Minoo-shi, Osaka-fu; Hiroshi Suzuki, Okazaki; Kazuhiko Sugita, Anjoh, all of Japan

[73] Assignees: Toyoda Koki Kabushiki, Kariya; Yoshiharu Namba, Monoo, both of Japan

[21] Appl. No.: 865,857

[22] Filed: May 22, 1986

[30] Foreign Application Priority Data

May 22, 1985 [JP] Japan ............................. 60-109874

[51] Int. Cl.$^4$ ............................................ B24B 41/04
[52] U.S. Cl. ....................... 51/134.5 R; 51/166 MH; 409/232
[58] Field of Search ............... 51/134.5, 168, 165.73, 51/166 MH, 166 TS, 266; 409/231–234; 408/239, 239 A

[56] References Cited

U.S. PATENT DOCUMENTS

| 3,454,311 | 7/1969 | Tomita et al. | 308/122 |
| 4,285,551 | 8/1981 | Suzuki et al. | 308/9 |
| 4,474,483 | 10/1984 | Suzuki et al. | 384/114 |
| 4,566,226 | 1/1986 | Kimura | 51/134.5 R |
| 4,587,765 | 5/1986 | Matsui | 51/165.73 |

FOREIGN PATENT DOCUMENTS 0203502  6/1939  Switzerland .................... 51/165.73

OTHER PUBLICATIONS

Catalog of "Neoceram" issued from Narumi Seito Kabushiki Kaisha, p. 5, photo 1.
Catalog of "Neoceram" issued from Nippon Electric Glass Co. Ltd., p. 11, photo at bottom right.

Primary Examiner—Frederick R. Schmidt
Assistant Examiner—Robert A. Rose
Attorney, Agent, or Firm—Oblon, Fisher, Spivak, McClelland, & Maier

[57] ABSTRACT

A spindle stock unit for surface grinding machines includes a spindle head, and a spindle assembly having a spindle body rotatably supported by a pair of axially spaced radial fluid bearings in the spindle head and positioned in place by a pair of axially spaced thrust fluid bearings in the spindle head. To minimize thermal displacement of the spindle assembly in an axial direction, the spindle body is made of crystallized glass of low coefficient of thermal expansion.

4 Claims, 2 Drawing Figures

SPINDLE STOCK UNIT FOR SURFACE GRINDING MACHINE

BACKGROUND OF THE INVENTION

1. Field of the Invention

The present invention relates to a spindle stock unit suitable for use in an ultra-precision surface grinding machine.

2. Description of the Prior Art

In a conventional spindle stock unit, a spindle is rotatably supported by a pair of axially spaced radial fluid bearings in a spindle head and positioned in place by a pair of axially spaced thrust fluid bearings in the spindle head. The spindle is, in general, made of quenched ferrous metal and finished by grinding in a predetermined configuration. During rotation of the spindle, the bearing surfaces of the spindle are heated by fluid friction to cause thermal expansion of the spindle, resulting in axial displacement of the spindle at its opposite ends. In use of such a spindle stock unit in an ultra-precision surface grinding machine, a grinding wheel is fixedly mounted on one end of the spindle in such a manner that the grinding surface of the wheel is arranged perpendicularly to the axis of the spindle to grind the surface of a workpiece on a table of the grinding machine. In such arrangement of the grinding wheel, it is not possible to ensure precise feeding of the grinding wheel toward the workpiece due to axial displacement of the spindle caused by thermal expansion.

SUMMARY OF THE INVENTION

It is, therefore, a primary object of the present invention to provide an improved spindle stock unit wherein the spindle is constructed to minimize thermal expansion thereof to ensure precise machining of the workpiece.

According to the present invention, the primary object is accomplished by providing a spindle stock unit which comprises a spindle head, and a spindle assembly having a spindle body rotatably supported by a pair of axially spaced radial fluid bearings in the spindle head and positioned in place by a pair of axially spaced thrust bearings in the spindle head, wherein the spindle body is made of crystallized glass of low coefficient of thermal expansion.

BRIEF DESCRIPTION OF THE DRAWINGS

Additional objects, features and advantages of the present invention will become readily apparent from the following detailed description of a preferred embodiment thereof when taken in connection with the accompanying drawings, in which.

DESCRIPTION OF THE PREFERRED EMBODIMENT

Figure 1:
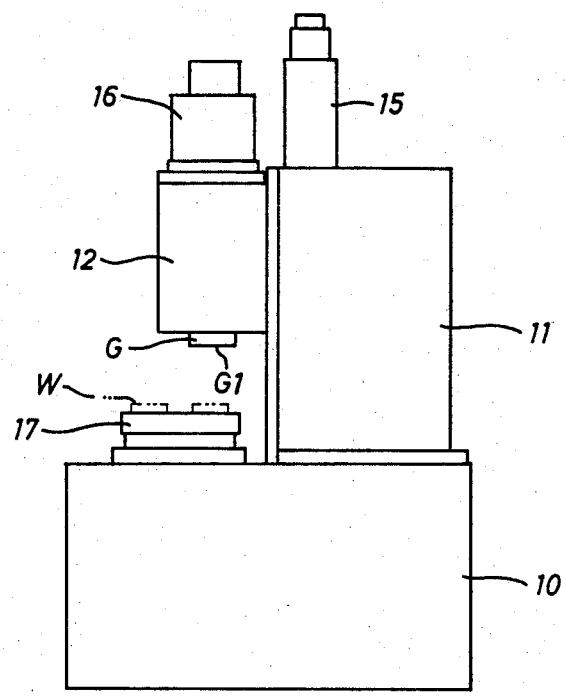
FIG. 1 is a front view of an ultra-precision surface grinding machine equipped with a spindle stock unit in accordance with the present invention.
Figure 2:
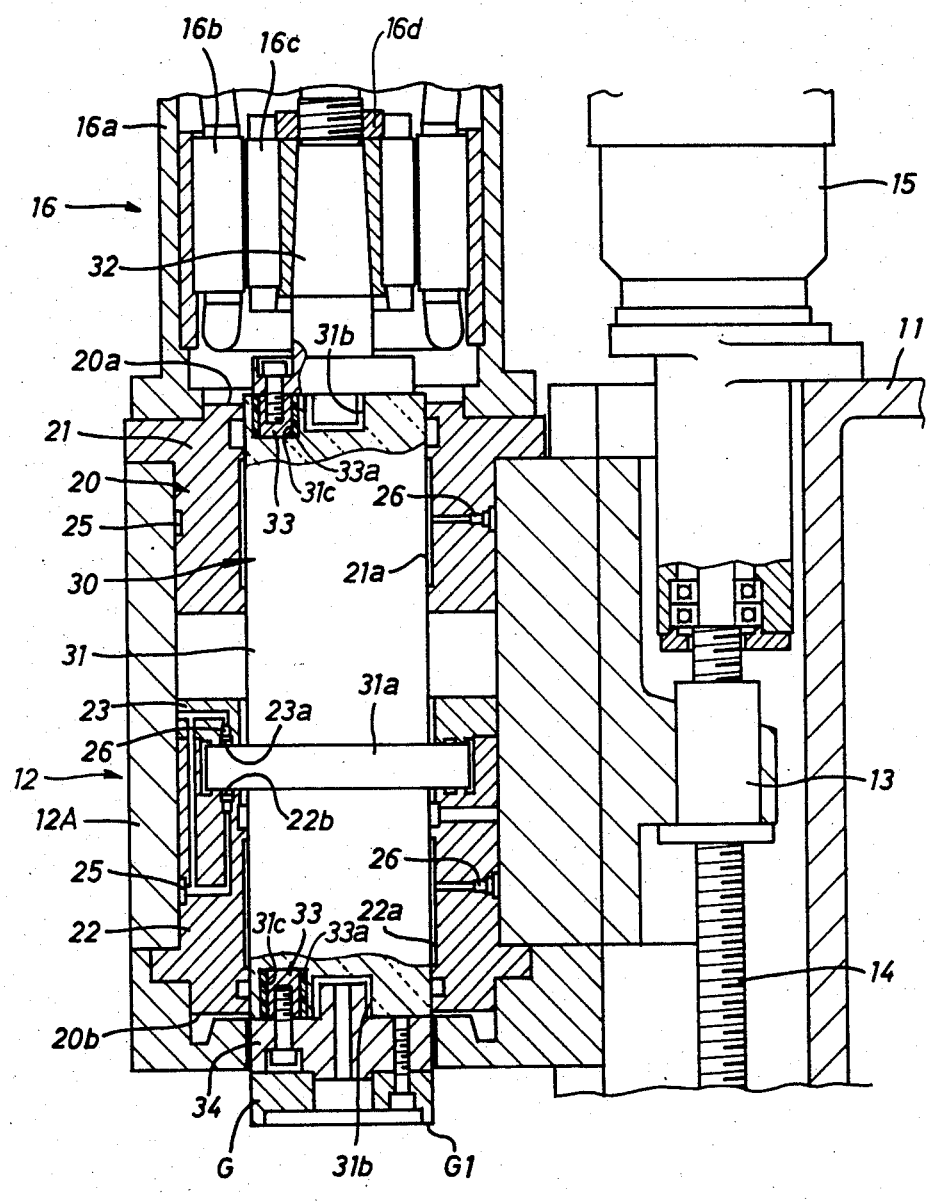
FIG. 2 is a sectional view of the spindle stock unit shown in FIG. 1.

Referring now to the drawings, FIG. 1 illustrates an ultra-precision surface grinding machine which comprises an upright column 11 mounted on a bed 10, and a spindle stock unit 12 slidably guided and supported on one side of the column 11 in a usual manner. As shown in FIG. 2, the spindle stock unit 12 includes a spindle head 12A, a bearing assembly 20 mounted within the spindle head 12A, a spindle assembly 30 rotatably supported by the bearing assembly 20 to rotate about a vertical axis, and a motor 16 mounted on the spindle head 12A and in drive connection with the spindle assembly 30.

The spindle head 12A is integrally provided with a feed nut 13 threadedly engaged with a vertical feed screw shaft 14 which is rotatably supported on the column 11 and drivingly connected to a servo motor 15 on the column 11. In the surface grinding machine, a grinding wheel G is fixed to the lower end of spindle assembly 30, and as shown in FIG. 1, a rotary table 17 is rotatably mounted on the bed 10 under the spindle stock 12 to support thereon a workpiece W.

As shown in FIG. 2, the spindle assembly 30 includes a spindle body 31 rotatably supported and positioned in place by means of the bearing assembly 20 in such a manner as described in detail below, and a tapered projection 32 fixedly mounted on the upper end of spindle 30 as described in detail below. The bearing assembly 20 comprises a pair of upper and lower bearing metal members 21 and 22 fixedly coupled within an axial bore in the spindle head 12A, and an internal bearing metal 23 coupled with the lower bearing metal 22. The upper bearing metal 21 is formed at the inner periphery thereof with a radial fluid bearing portion 21a, while the lower bearing metal 22 is formed at the inner periphery thereof with a radial fluid bearing portion 22a which is axially spaced from the radial fluid bearing portion 21a. The lower bearing metal 22 is further formed at a stepped upper end thereof with a thrust fluid bearing portion 22b, while the internal bearing metal 23 is formed at the lower end thereof with a thrust fluid bearing portion 23a which is opposed to the thrust fluid bearing portion 22b in an axial direction.

The fluid bearing portions 21a, 22a, 22b and 23a each are in the form of a static bearing and arranged to be supplied with pressurized fluid from a fluid pump (not shown) through annular grooves 25 and radial throttle passages 26 respectively formed in the bearing metals 21 and 22. Thus, the spindle body 31 is rotatably supported by the pair of axially spaced radial fluid bearing portions 21a and 22a with a slight clearance. The spindle body 31 is formed at an intermediate portion thereof with an annular flange 31a which is disposed between the pair of axially spaced thrust bearing portions 22b and 23a with a slight clearance to position the spindle assembly 30 in place.

In this embodiment, it is to be noted that the spindle body 31 is made of crystallized glass of low coefficient of thermal expansion which consists essentially of $SiO_2$, $Al_2O_3$, $Li_2O$ and zirconia. The crystallized glass is manufactured by Narumi Seito Kabushiki Kaisha in Japan and distibuted with a trademark "Neoceram". The linear expansion coefficient of the crystallized glass is $-0.2$ to $-0.3 \times 10^{-6}/°C$. which is extremely smaller than that of ferrous metal (approximately, $12 \times 10^{-6}/°C$.).

In the spindle stock unit, opposite ends of spindle body 31 each project slightly from the upper and lower ends 20a and 20b of bearing assembly 20 and are formed with a center hole 31b coaxial with the axis of spindle assembly 30 and a plurality of circumferentially equi-spaced axial holes 31c on a circular path concentric with the center hole 31b. A metallic support 33 is coupled within each of the axial holes 31c and adhered in place. The tapered projection 32 of spindle assembly 30 is made of ferrous metal and fixed to the upper end of spindle body 31 by means of a plurality of fastening bolts threaded into the metallic supports 33. The motor 16 includes a casing 16a secured to the upper end of spindle head 12, a stator 16b fixedly coupled within the casing 16a, and a rotor 16c fixedly mounted on the tapered projection 32 of spindle assembly 30 by means of a ring nut 16d. Similarly to the tapered projection 32, an attachment plate 34 of invar is fixed to the lower end of spindle body 31 by means of a plurality of fastening bolts threaded into the metallic supports 33 and carries the grinding wheel G bolted thereto. The grinding wheel G has a body portion made of invar and a grinding surface G1 formed at its lower end and coated with diamond abrasive particles. The external diameter of each of the metallic supports 33 is made smaller than the internal diameter of the mating axial hole 31c to provide therebetween a clearance which is sufficient to absorb the difference in thermal expansion between each metallic support 33 and the spindle body 31. A suitable abrasive compound 33a such as epoxy resin which has an elasticity even after being dried is filled up in the clearance to adhere each metallic support 33 in position within the mating axial hole 31c.

In operation of the surface grinding machine described above, the spindle assembly 30 is driven by the motor 16 to rotate the grinding wheel G, and the feed screw shaft 14 is driven by the servo motor 15 to move the spindle head 12A toward the table 17. Thus, the grinding wheel G is moved to grind the surface of work piece W on rotary table 17. During rotation of the spindle assembly 30, a heating value at the respective fluid bearing portions 21a, 22a, 22b and 23a increases approximately in proportion to a square of the rotational speed of spindle assembly 30. As a result, the temperature of spindle body 31 rises in accordance with an increase of the heating value. In this embodiment, however, thermal expansion of the spindle body 31 is restrained to an extremely small value because the coefficient of thermal expansion of spindle body 31 is extremely smaller than that of ferrous metal. This is effective to minimize thermal displacement of the spindle assembly 30 in an axial direction so as to ensure precise feed of the grinding surface G1 of wheel G toward the surface of workpiece W.

Although a specific embodiment of the present invention has been shown and described, it is obvious that many modifications thereof are possible. The invention, therefore, is not intended to be restricted to the exact showning of the drawings and description thereof, but is considered to include reasonable and obvious equivalents.

What is claimed is:

1. A spindle stock unit for grinding machines, comprising a spindle head, and a spindle assembly having a spindle body rotatably supported by a pair of axially spaced radial fluid bearings in said spindle head through a static pressure of fluid supplied between said spindle body and each of said axially spaced radial fluid bearings, said spindle body being integrally formed at an intermediate portion thereof with an annular flange disposed between a pair of axially spaced thrust fluid bearings in said spindle head and being positioned axially in place by said pair of axially spaced thrust bearings through a static pressure of fluid supplied between each of axial opposite end surfaces of said annular flange and each of said thrust fluid bearings, wherein said spindle body is made of crystallized glass of low coefficient of thermal expansion and has at least the same axial length as that between axial opposite ends of said pair of axially spaced radial fluid bearings.

2. A spindle stock unit for grinding machines, comprising a spindle head, and a spindle assembly having a spindle body rotatably supported by a pair of axially spaced radial fluid bearings in said spindle head and positioned in place by a pair of axially spaced thrust fluid bearings in said spindle head, wherein said spindle body is made of crystallized glass of low coefficient of thermal expansion, wherein said spindle body is formed at opposite ends thereof with a plurality of circumferentially spaced axial holes on a circular path concentric with said spindle body, respectively, and a metallic support is coupled within each of said axial holes and adhered in place, and wherein said spindle assembly includes a metallic projection fixed to one end of said spindle body through said metallic supports for drive connection with a motor mounted on said spindle head, and an attachment plate of invar fixed to the outer end of said spindle body through said metallic supports for carrying a grinding wheel thereon.

3. A spindle stock unit as claimed in claim 2, wherein said crystallized glass consists essentially of $SiO_2$, $Al_2O_3$, $Li_2O$ and zirconia.

4. A spindle stock unit as claimed in claim 2, wherein said spindle body is integrally formed at an intermediate portion thereof with an annular flange disposed between said thrust fluid bearings to position said spindle assembly in place.

* * * * *

UNITED STATES PATENT AND TRADEMARK OFFICE
CERTIFICATE OF CORRECTION

PATENT NO. : 4,700,510

DATED : October 20, 1987

INVENTOR(S) : Yoshiharu Namba et al

It is certified that error appears in the above-identified patent and that said Letters Patent is hereby corrected as shown below:

On the title page assignee should read

--(73) Assignee: Toyoda Koki Kabushiki Kaisha, Kariya; Yoshiharu Namba, Minoo-Shi both of Japan --.

Signed and Sealed this

Tenth Day of May, 1988

*Attest:*

DONALD J. QUIGG

*Attesting Officer*         *Commissioner of Patents and Trademarks*